US011792805B2

(12) United States Patent
Elshafie et al.

(10) Patent No.: US 11,792,805 B2
(45) Date of Patent: Oct. 17, 2023

(54) METHOD AND APPARATUS FOR NON-COHERENT PUCCH TRANSMISSION

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 17/303,274

(22) Filed: May 25, 2021

(65) Prior Publication Data
US 2021/0377992 A1 Dec. 2, 2021

Related U.S. Application Data

(60) Provisional application No. 63/030,881, filed on May 27, 2020.

(51) Int. Cl.
*H04W 72/21* (2023.01)
*H04W 72/1268* (2023.01)
*H04L 27/26* (2006.01)
*H04W 72/0453* (2023.01)
*H04W 72/0446* (2023.01)
*H04L 5/00* (2006.01)

(52) U.S. Cl.
CPC ........... *H04W 72/21* (2023.01); *H04L 5/0048* (2013.01); *H04L 5/0053* (2013.01); *H04L 27/2613* (2013.01); *H04L 27/2628* (2013.01); *H04L 27/26134* (2021.01); *H04W 72/0446* (2013.01); *H04W 72/0453* (2013.01); *H04W 72/1268* (2013.01)

(58) Field of Classification Search
None
See application file for complete search history.

(56) References Cited

FOREIGN PATENT DOCUMENTS

ES 2927694 T3 * 11/2022 ........... H04L 1/1671

* cited by examiner

*Primary Examiner* — Walter J Divito
(74) *Attorney, Agent, or Firm* — Arent Fox, LLP

(57) ABSTRACT

The apparatus of wireless communication is a UE and a base station. The UE received a control information indicating a reference signal (RS) mode for a non-coherent transmission of an UCI to the base station. The UE in the RS mode may map an RS according to an RS pattern and the UCI into resource elements assigned for a PUCCH to transmit the UCI and transmit an uplink control signal including the RS and the UCI to the base station over the PUCCH. The UE may determine a RS pattern and puncture the resource elements mapped with the code point of the UCI that corresponds to the RS pattern and map the RS based on the RS pattern. The UE may map the RS based on the RS pattern and map the code point by rate matching around the resource into which the RS is mapped.

20 Claims, 14 Drawing Sheets

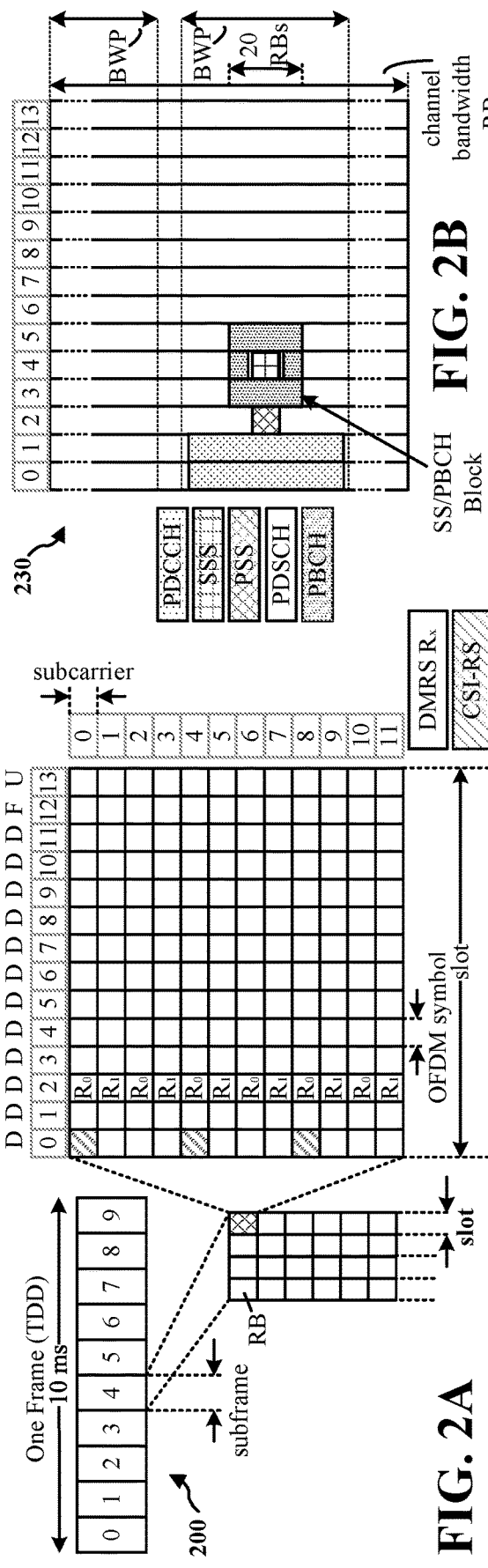
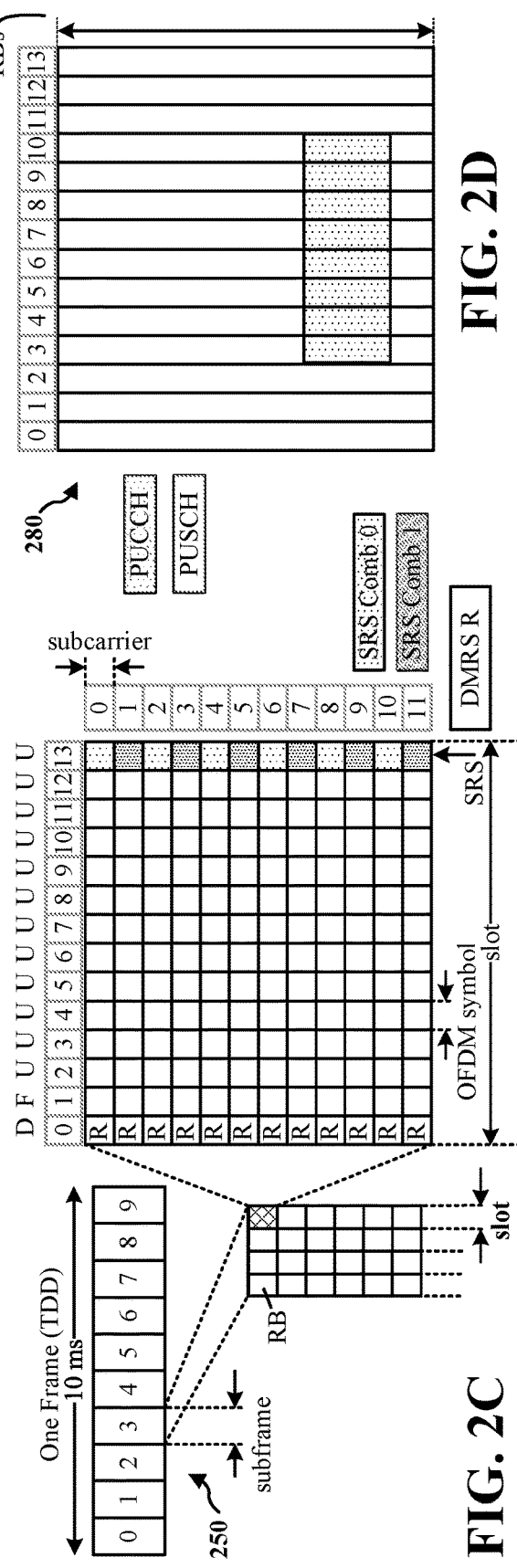

| Size N DFT matrix, with N rows and N columns | $DFT_N(n) = [\omega^{0n}, \omega^{1n}, \omega^{2n}, \ldots, \omega^{tn}, \ldots, \omega^{(N-1)n}]$ <br><br> Column n <br><br> row n → $W = \frac{1}{\sqrt{N}} \begin{bmatrix} 1 & 1 & 1 & \cdots & 1 & \cdots & 1 \\ 1 & \omega & \omega^2 & \cdots & \omega^t & \cdots & \omega^{(N-1)} \\ 1 & \omega^2 & \omega^4 & \cdots & \omega^{2t} & \cdots & \omega^{2(N-1)} \\ \vdots & \vdots & \vdots & \ddots & \vdots & & \vdots \\ 1 & \omega^{N-1} & \omega^{2(N-1)} & \cdots & \omega^{t(N-1)} & \cdots & \omega^{(N-1)(N-1)} \end{bmatrix}$ <br><br> $\omega = e^{-j2\pi/N}$ or $e^{j2\pi/N}$ <br><br> (where $j = \sqrt{-1}$, $0 \le l \le M-1$, and $1 \le m \le M$) |
|---|---|
| S(CS index m) | Tone index → $\begin{bmatrix} S(M-1)e^{-j2\pi(M-1)m/M} \\ \vdots \\ S(2)e^{-j2\pi 2m/M} \\ S(1)e^{-j2\pi 1m/M} \\ S(0)e^{-j2\pi 0m/M} \end{bmatrix}$ ← Tone index = $l$ <br><br> S with cyclic shift m in time domain=phase ramp with slope $-j2\pi m/M$ or $j2\pi m/M$ |

< Table 1. N DFT matrix and >

FIG. 3B

| No Frequency Hopping | | | | Frequency Hopping | | | |
|---|---|---|---|---|---|---|---|
| | h | h | h | | h1 | h1 | h2 | h2 |
| DFT vector in Codepoint 0 | 1, | 1, | 1 | DFT vector in Codepoint 0 | 1, | 1, | 1, | 1 |
| DFT vector in Codepoint 1 | 1, | j, | -1, | -j | DFT vector in Codepoint 1 | 1, | j, | -1, | -j |

<Table 2. frequency hopping and orthogonality of codebook>

FIG. 3C

<Table 3. Example of maintaining orthogonality for frequency hopping>

METHOD AND APPARATUS FOR NON-COHERENT PUCCH TRANSMISSION

CROSS-REFERENCE TO RELATED APPLICATIONS

This application claims the benefit of U.S. Provisional Application Ser. No. 63/030,881, entitled "METHOD AND APPARATUS FOR NON-COHERENT PUCCH TRANSMISSION" and filed on May 27, 2020, the disclosure of which is expressly incorporated by reference herein in its entirety.

BACKGROUND

Technical Field

The present disclosure relates generally to communication systems, and more particularly, to a method and apparatus for a non-coherent physical uplink control channel (PUCCH) transmission including a reference signal (RS).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment and a base station. The UE may receive a control information from a base station, the control information indicating an RS mode for a non-coherent transmission of an uplink control information (UCI) to the base station. The UE in the RS mode may map a demodulation RS (DMRS) according to a DMRS pattern and the UCI into resource elements assigned for an PUCCH by the control information to transmit the UCI, and transmit an uplink control signal including the DMRS and the UCI to the base station over the PUCCH. The UE may determine the DMRS pattern based on the control information received from the base station. The UE may select a code point corresponding to a code word of the UCI from a codebook including orthogonal sequences generated based on the control information received from the base station. The UE may map the DMRS and the UCI into the resource elements by mapping the code point of the UCI into the resource elements assigned for the uplink control channel, puncturing the resource elements mapped with the code point of the UCI that corresponds to the DMRS pattern, and mapping the DMRS into the punctured resource elements based on the DMRS pattern. A number of orthogonal sequences of the codebook is equal to a number of the resource elements $Num_{RE}$ assigned for the PUCCH by the control information received from the base station. The UE may also map the DMRS and the UCI into the resource elements by mapping the DMRS into the resource elements according to the DMRS pattern, and mapping the code point of the UCI into the resource elements assigned for the PUCCH by rate matching around the resource elements into which the RS is mapped according to the RS pattern. The number of orthogonal sequences of the codebook is determined as $(Num_{RE}-Num_{RS})$, where the $Num_{RS}$ is a number of DMRS assigned for the PUCCH by the control information received from the base station. The DMRS pattern may be distributed along a time domain and/or a frequency domain. When PUCCH is switched between at least two sub-bands in different frequency bandwidths with different channel coefficients based on the control information received from the base station, the DMRS pattern may be distributed along a time domain, with at least one DMRS included in each of the at least two sub-bands. The control information may be a downlink control information (DCI) or a configured grant (CG) including a radio resource control (RRC) message and/or a medium access control (MAC) control element (CE) (MAC-CE), enabling or disabling the RS mode. The UE may enable the RS mode for the non-coherent transmission of the UCI to the base station based on the control information. The UE may dynamically enable/disable the RS mode based on the DCI received from the base station, and semi-statically disable the RS mode after a duration of time set based on the CG.

The base station may transmit the control information to the UE indicating the RS mode for the UE to transmit the DMRS for the non-coherent transmission of the UCI to the base station. The base station may receive the uplink control signal from the UE over the PUCCH, and estimate the channel parameters based on the DMRS in the uplink control signal. The DMRS may be distributed in the PUCCH according to the DMRS pattern determined based on the control information the base station transmitted to the UE. The base station may compensate the uplink control signal based on the channel parameters estimated based on the DMRS. The base station then may decode the uplink control signal received from the UE into the code point, and determine the UCI based on the code word corresponding to the code point decoded from the uplink control signal. The channel parameters may include the first-order channel parameters such as a Doppler spread error, a delay spread error, and/or a timing error of the uplink control channel, and the uplink control signal may be compensated based on the channel parameters of the PUCCH. The base station may decode the uplink control signal by replacing the resource elements of the uplink control signal corresponding to the DMRS pattern with 0, based on instructing the UE to map the DMRS into the punctured resource elements of the uplink control signal, and decoding the uplink control signal on the resource elements of the PUCCH received from the UE into the code point by two dimensional (2D) inverse discrete Fourier transform (IDFT) sequence detecting based on the $\text{Num}_{RE}$ resource elements assigned for the uplink control channel. Also, the base station may decode of the uplink control signal by decoding the uplink control signal on the resource elements of the PUCCH received from the UE into the code point by two dimensional (2D) inverse discrete Fourier transform (IDFT) sequence detecting based on the ($\text{Num}_{RE}-\text{Num}_{RS}$) resource elements not corresponding to the DMRS pattern assigned for the uplink control channel, based on instructing the UE to rate match the code point of the UCI around the resource elements mapped with the DMRS. In case the base station instructed the UE to perform frequency hopping by switching a distribution of the PUCCH between at least two sub-bands in different frequency bandwidths with different channel coefficients, the base station may decode the uplink control signal by dividing each of the uplink control signal on the resource elements of the PUCCH distributed in at least two sub-bands by the corresponding channel coefficient. The base station may transmit the DCI to dynamically enabling or disabling the RS mode of the UE, and may transmit the RRC message and/or the MAC-CE to semi-statically enable the RS mode of the UE for a duration of time.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 3B is a diagram illustrating an example size N discrete Fourier Transform matrix and a base sequence S with a cyclic shift.

FIG. 3C is a diagram illustrating an example of frequency hopping and orthogonality of codebook.

DETAILED DESCRIPTION

Figure 1:
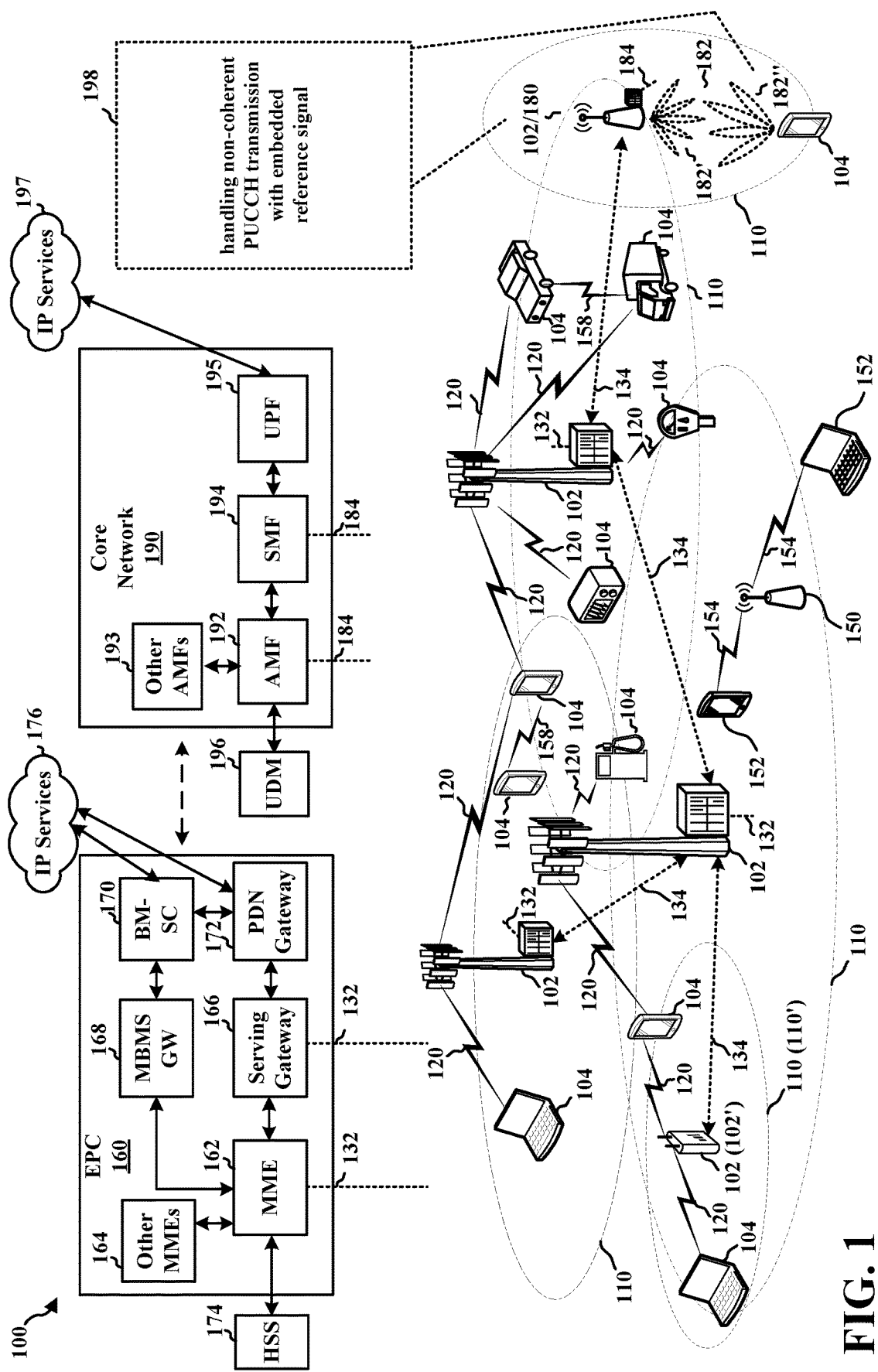
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and the base station 102/180 may be configured to handle a non-coherent PUCCH transmission including a reference signal (198). Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC- FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DMRS) (indicated as $R_x$ for one particular configuration, where 100× is the port number, but other DMRS configurations are possible) and channel state information reference signals (CSI-RS) for channel estimation at the UE. The RS may also include beam measurement RS (BRS), beam refinement RS (BRRS), phase tracking RS (PT-RS), and tracking reference signal (TRS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3A:
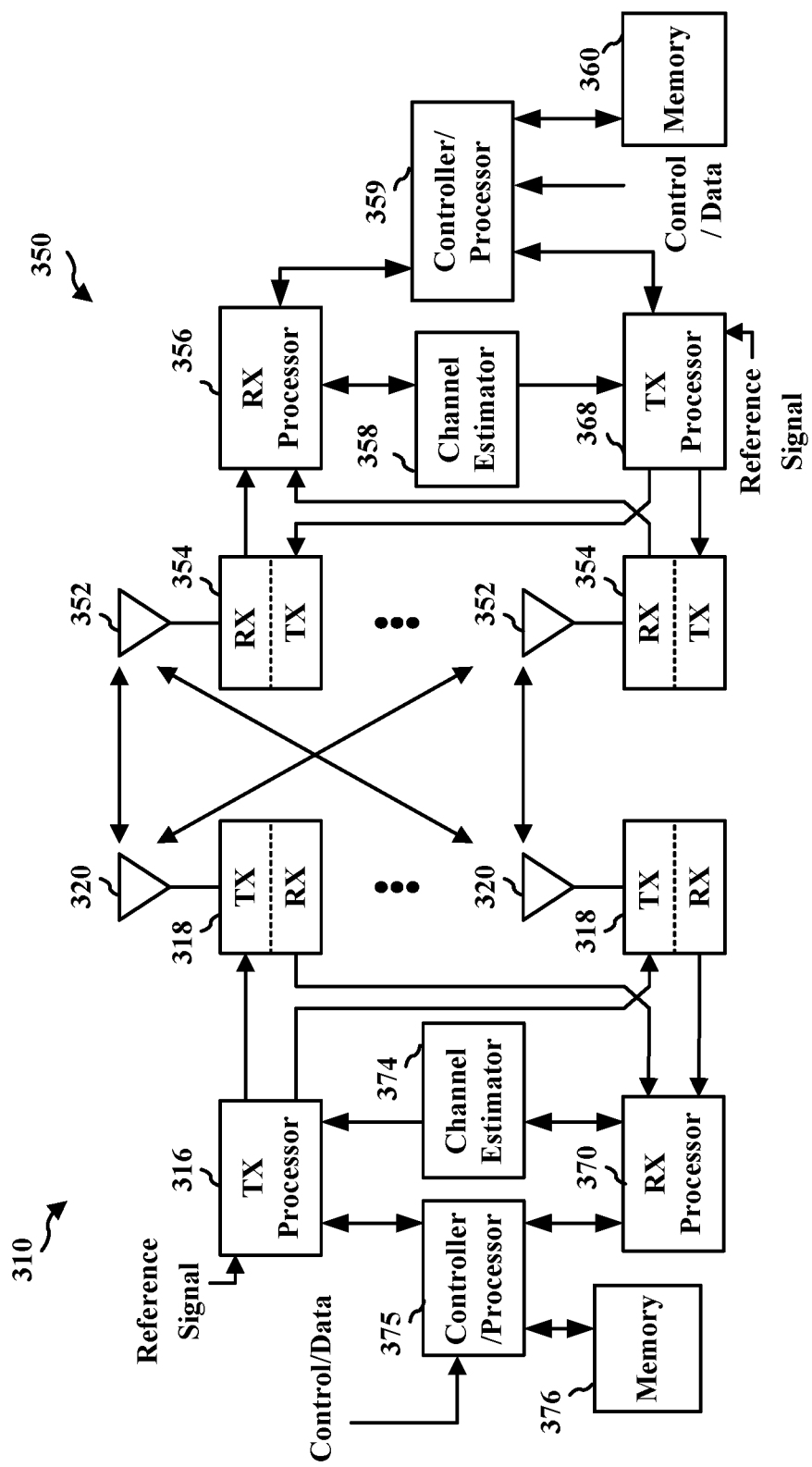
FIG. 3A is a diagram illustrating an example of a base station and user equipment (UE) in an access network.

FIG. 3A is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 198 of FIG. 1.

Wireless systems may provide a receiver with a DMRS, and the receiver may perform channel estimation based on the DMRS and perform demodulation based on the channel estimation. That is, the transmitter may transmit DMRS with a payload (or data), and the receiver may coherently demodulate/decode the transmitted signal based on the channel estimation.

However, the performance of DMRS-based communication may be degraded in a wireless communication environment with a low signal to noise ratio (SNR). For example, the energy used to transmit the DMRS does not contain any information regarding data transmission. Also, due to the low SNR, the channel estimation may have reduced quality resulting in increased performance degradation during the demodulation/decoding process. Therefore, at low SNR, a non-coherent transmission, which does not send DMRS, may have increased performance over a coherent transmission.

For example, non-orthogonal sequences may be used to transmit the PUCCH in a non-coherent fashion, which refers to transmitting the UCI payload only without a DMRS. Such a design may be applicable for a medium sized UCI payload of between 8 bits and 40 bits. For another example, orthogonal sequences may be used to transmit the PUCCH in a non-coherent fashion. Such a design may be applicable for a small-sized UCI payload of between 1 bit and 7 bits.

In the 5G/NR, The UE may transmit a PUCCH using a resource grid (a time*frequency grid, also referred to as a set of RBs) assigned by the base station. The UE may follow the procedures provided below to transmit a UCI payload of K bits on each assigned PUCCH resource element. The UE may generate an orthogonal matrix of size N*M based on $DFT_N(n) \otimes (CS\ index\ m)$, where $\otimes$ is a Kronecker product operation. S may be a cell specific low Peak-To-Average-Power Ratio (PAPR) sequence with length M. The UE may construct a codebook of size $2^K$ based on the orthogonal matrix. To transmit the payload of K bits, e.g., $b_0 b_1 b_2 \ldots b_{K-1}$, the UE may convert the payload bit stream into a decimal number k, then transmit the $k^{th}$ code point from the constructed codebook. The UE may transmit the $k^{th}$ code point as an uplink control signal y over the PUCCH to the base station. The base station may receive the uplink control signal y on the PUCCH resource (the time*frequency grid, e.g., a RB), decode the uplink control signal y to recover the code point, and determine the UCI based on the code word corresponding to the code point recovered from the uplink control signal y.

The size N*M orthogonal matrix may be generated from a Kronecker product of a discrete Fourier transformation (DFT) matrix and a base sequence S with a cyclic shift (CS). Here, $DFT_N(n)$ is $n^{th}$ row or column drawn from the DFT matrix of size N (n=0, 1, . . . , N−1), S(CS index m) is $m^{th}$ frequency domain base sequence S with cyclic shift (CS) index in time domain, or equivalently with phase ramp $e^{j2\pi lm/M}$ or $e^{-j2\pi lm/M}$ on each $l^{th}$ tone (m=0, 1, . . . , M−1). N is the number of OFDM symbols and M is the number of tones. In some examples, i may be referred to as an OFDM symbol index of the N OFDM symbols of the resource grid. Please refer to Table 1 390a as shown in FIG. 3B.

Accordingly, the UE may generate the codebook of the size N×M orthogonal matrix, as provided below.

$$DFT_N(n) \otimes S(CS\ index\ m) = [\omega^{0n}, \omega^{1n}, \omega^{2n}, \ldots, \omega^{in}, \ldots \omega^{(N-1)n}] \otimes \quad \text{(Equation 1)}$$

$$\begin{bmatrix} S(M-1)e^{-j2\pi(M-1)m/M} \\ \vdots \\ S(i)e^{-j2\pi im/M} \\ \vdots \\ S(2)e^{-j2\pi 2m/M} \\ S(1)e^{-j2\pi 1m/M} \\ S(0)e^{-j2\pi 0m/M} \end{bmatrix} = \begin{bmatrix} S(M-1)e^{-j2\pi(M-1)m/M}w^{0n} & \ldots & S(M-1)e^{-j2\pi(M-1)m/M}w^{in} & \ldots & S(M-1)e^{-j2\pi(M-1)m/M}w^{(N-1)n} \\ \vdots & & \vdots & & \vdots \\ S(i)e^{-j2\pi im/M}w^{0n} & \ldots & S(i)e^{-j2\pi im/M}w^{in} & \ldots & S(i)e^{-j2\pi im/M}w^{(N-1)n} \\ \vdots & & \vdots & & \vdots \\ S(2)e^{-j2\pi 2m/M}w^{0n} & \ldots & S(2)e^{-j2\pi 2m/M}w^{in} & \ldots & S(2)e^{-j2\pi 2m/M}w^{(N-1)n} \\ S(1)e^{-j2\pi 1m/M}w^{0n} & \ldots & S(1)e^{-j2\pi 1m/M}w^{in} & \ldots & S(1)e^{-j2\pi 1m/M}w^{(N-1)n} \\ S(0)e^{-j2\pi 0m/M}w^{0n} & \ldots & S(2)e^{-j2\pi 0m/M}w^{in} & \ldots & S(2)e^{-j2\pi 0m/M}w^{(N-1)n} \end{bmatrix}$$

The constructed codebook is orthogonal based on the assumption that the communication channel is constant across all OFDM symbols of the PUCCH transmission. Therefore, when frequency hopping is used, the orthogonality of the codebook matrix may be reduced/degraded. This is because the size N DFT matrix cannot maintain orthogonality if the channel changes across N OFDM symbols. Further explanation will be provided referring to Table 2 390b as shown in FIG. 3C.

Table 2 390b as shown in FIG. 3C, illustrates an example of orthogonality between two vectors with no frequency hopping and the loss of orthogonality between the two vectors as a result of frequency hopping every 2 OFDM symbols. The examples illustrate that N=4 and M=1. Without frequency hopping the channel coefficient is h, and therefore, if the code point 0 is transmitted, the received signal is measured as [h, h, h, h]. When correlating the received signal with code point 1, which is orthogonal to code point 0, the output is h*1+h*j+h*(−1)+h*(−j)=0. Therefore, the code point 0 and the code point 1 are orthogonal from the receiver's perspective, and the receiver may use a single codebook to decode the received signal to determine the code word corresponding to the code point.

When channel hopping occurs every two OFDM symbol, the channel coefficients are not constant due to the frequency hopping. Here, the two different channel coefficients are represented as $h_1$ and $h_2$. When the transmitter sends the code point 0, the receiver receives the signal of [$h_1$, $h_1$, $h_2$, $h_2$]. When correlating the received signal with code point 1, which is supposed to be orthogonal, the output is $h_1$*1+$h_1$*j+$h_2$*(−1)+$h_2$*(−j)≠0. Therefore, the code point 0 and the code point 1 are not orthogonal from the receiver's perspective, and the receiver may not use the same codebook to decode the received signal to determine the code word corresponding to the code point.

Figure 3D:
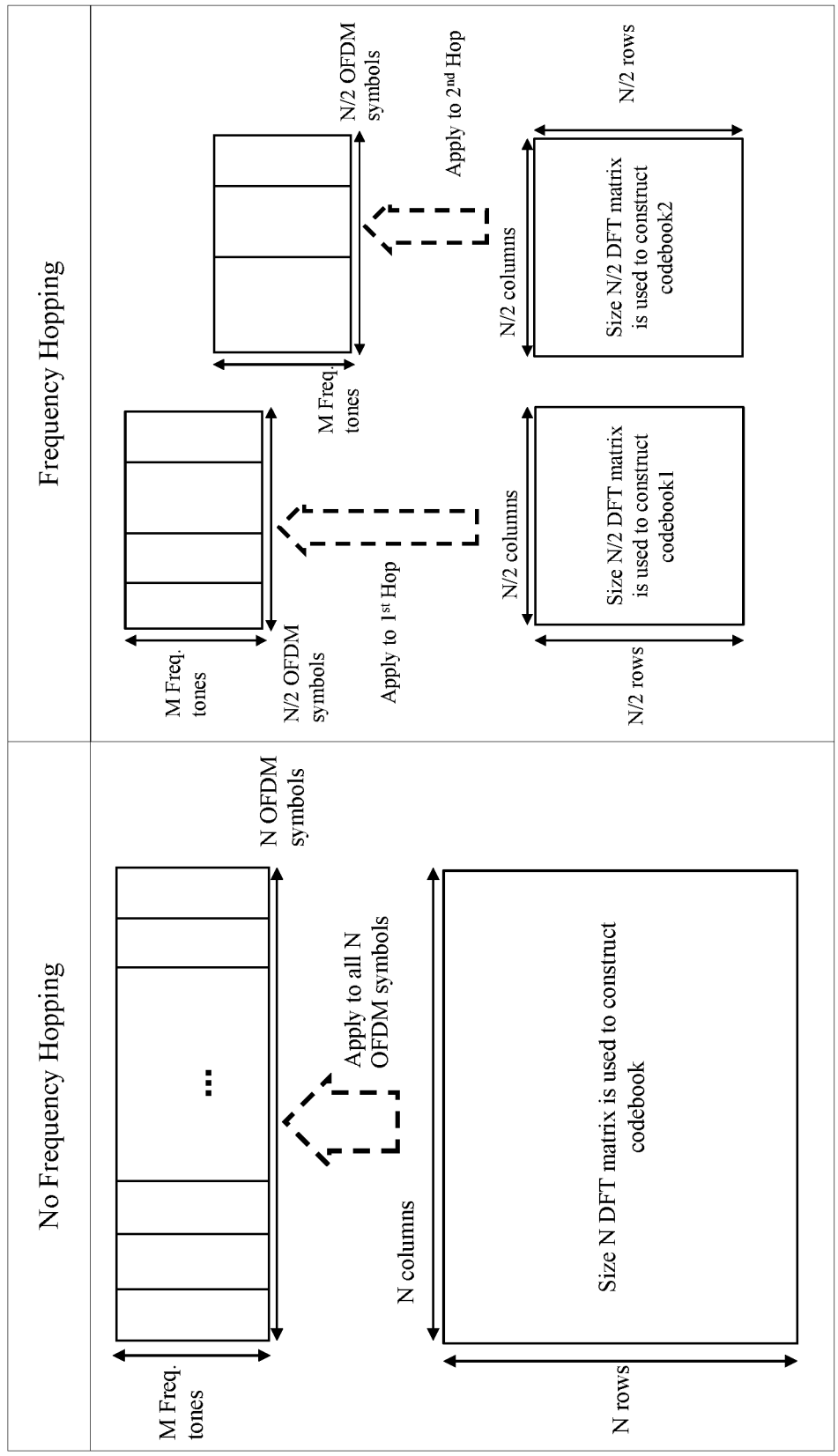
FIG. 3D is a diagram illustrating a an example of maintaining orthogonality for frequency hopping.

To preserve the orthogonality of the vectors with frequency hopping, the UE and the base station may use a DFT matrix of half the size to separately generate two different codebooks based on the PUCCH being split across two frequencies due to the frequency hopping. For example, the UE and the base station may use smaller DFT matrix of size N/2 to construct two smaller codebooks, and transmit the portion of the PUCCH in each hop using the corresponding smaller codebook that corresponds with each frequency of the frequency hopping. Orthogonality may be preserved within each hop with smaller code book, as illustrated in Table 3 390c as shown in FIG. 3D. However, according to this example, the UE and the base station need to generate and maintain two different smaller code books.

In some aspects of the disclosure, a hybrid form of PUCCH transmission is provided. For example, the UE may embed a DMRS, a TRS, and/or an RS with a very sparse pattern in the sequence based PUCCH. The purpose of embedding a DMRS, a TRS, and/or an RS in the PUCCH is to help the base station estimate first-order channel parameters, such as Doppler spread error, delay spread error, timing error, etc. The DMRS, the TRS, and/or the RS embedded PUCCH may improve the decoding performance of the base station.

Also, in case of frequency hopping, if the DMRS, the TRS, and/or the RS patterns having DMRS, the TRS, and/or RS tones spread across OFDM time symbols in the time domain are provided, the base station may use the DMRS, the TRS, and/or the RS to estimate the channel coefficients h and equalize the coefficients to enable coherent combining across different frequency hops. Accordingly, the base station may preserve the orthogonality of the codebook without maintaining two different codebooks as well as two different-size IDFTs at the base station during frequency hopping.

Figure 4:
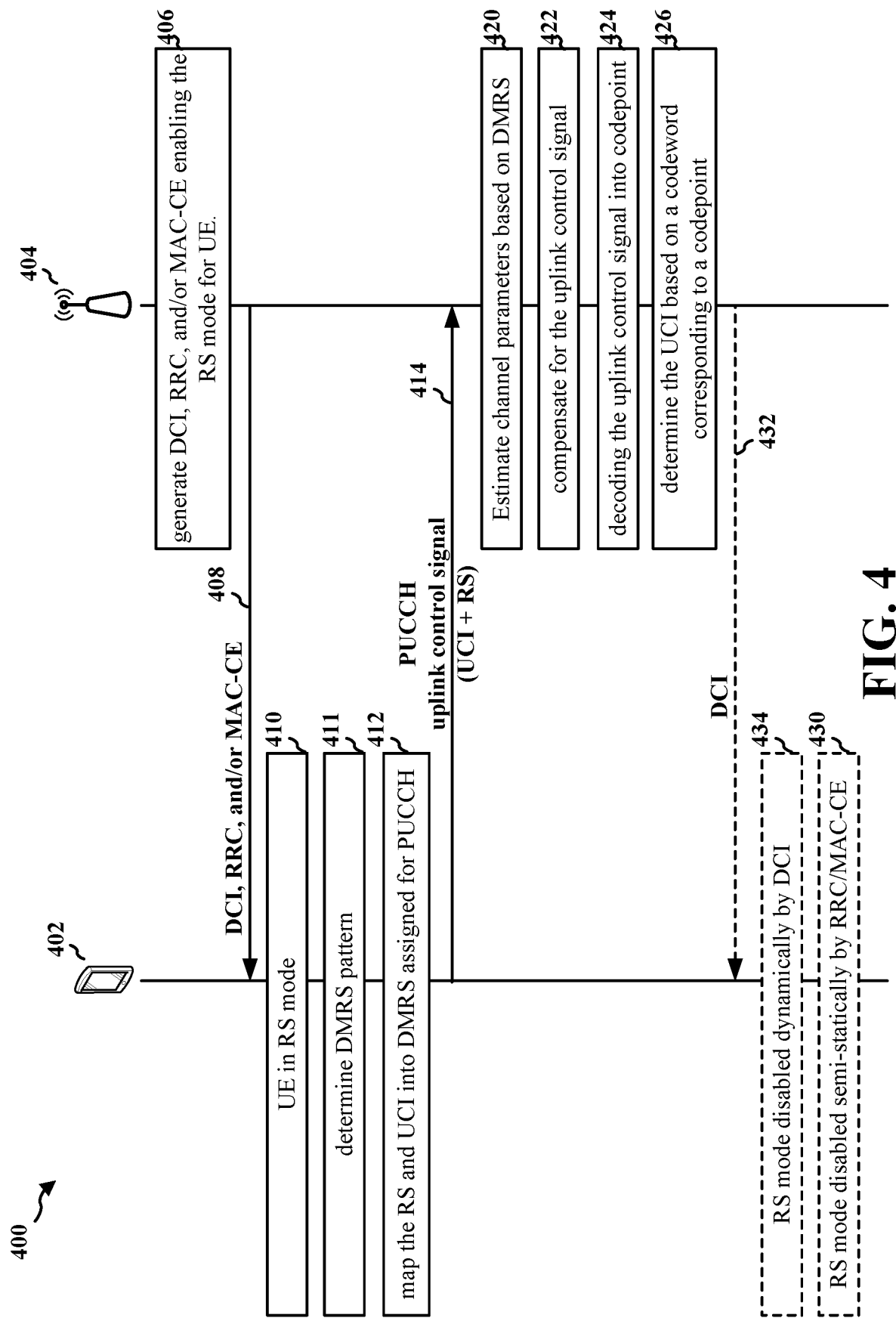
FIG. 4 is a call diagram of wireless communication.

FIG. 4 is a call flow diagram 400 of wireless communication. Here, the UE 402 may refer to the UE 104/350, and the base station 404 may refer to the base station 102/180/310. The base station 404 may decide to enable the RS mode in UE, based on multiple factors. For example, the base station 404 may decide to enable the RS mode in UE 402 based on low SNR or size of the UCI payload in the transmission buffer of the UE.

The base station 404 may generate a control information to instruct the UE 402 to enable the RS mode 406. The base station may include the control information in the DCI or the CG. The CG may include the RRC message and/or the MAC-CE.

The base station 404 may transmit the DCI, the RRC message, and/or the MAC-CE 408 instructing the UE 402 to enable the RS mode at the UE 402. The UE 402 may receive the DCI, the RRC message, and/or the MAC-CE from the base station 404, and enable the RS mode 410 for a non-coherent transmission of an uplink control information (UCI) to the base station 404. Upon entering the RS mode, the UE 402 may determine the DMRS, the TRS, and/or the RS pattern 411 from the control information received from the base station 404.

The UE 402 may map the DMRS, the TRS, and/or the RS and UCI into resource elements assigned for the PUCCH by the control information 412. In one example, the UE 402 may map the DMRS, the TRS, and/or the RS and the UCI into the resource elements by mapping the code point of the UCI into the resource elements assigned for the PUCCH. The UE 402 may then puncture the resource elements mapped with the code point of the UCI that corresponds to the DMRS, the TRS, and/or the RS pattern, and map the DMRS, the TRS, and/or the RS into the punctured resource elements based on the DMRS, the TRS, and/or the RS pattern. Here, puncturing a resource element refers to deleting the data mapped to the resource element and inserting the corresponding DMRS, the TRS, and/or the RS tone into the resource element. According to a current example, the base station 404 may receive the uplink control signal and perform channel estimation based on the DMRS, the TRS, and/or the RS, replace the resource elements corresponding to the DMRS, the TRS, and/or the RS pattern with zero values, and then decode the uplink control signal. The punctured resource elements may add errors to the decoding process at the base station 404. Since the DMRS, the TRS, and/or the RS is provided sparsely and the error may be introduced throughout the IDFT process, the base station 404 may successfully decode the uplink control signal despite the additional error from the punctured resource element. In this case, the number of orthogonal sequences of the codebook may be maintained equal to a number of the resource elements $\text{Num}_{RE}$ assigned for the PUCCH by the control information. For example, when the control information received from the base station 404 assigns M frequency tones and N OFDM symbols, $\text{Num}_{RE}$=M×N resource elements are assigned for the PUCCH by the control information.

In another example, the UE 402 may map the DMRS, the TRS, and/or the RS and the UCI into the resource elements by first mapping the DMRS, the TRS, and/or the RS into the resource elements according to the DMRS, the TRS, and/or the RS pattern and then mapping the code point of the UCI into the resource elements assigned for the uplink control channel by rate matching around the resource elements mapped with the DMRS, the TRS, and/or the RS. By rate matching around the resource elements to which the DMRS, the TRS, and/or the RS is mapped, the UE 402 and the base station 404 may embed the DMRS, the TRS, and/or the RS without introducing additional error. However, since the code point of the UCI is mapped into the resource elements assigned for the uplink control channel by rate matching around the resource elements to which the RS is mapped, the number of orthogonal sequences of the codebook is determined as ($\text{Num}_{RE}$−$\text{Num}_{RS}$), where $\text{Num}_{RS}$ is a number of DMRS and/or TRS assigned for the uplink control channel by the control information received from the base station 404. For example, when the control information received from the base station 404 assigns M frequency tones, N OFDM symbols and 4 symbols for the DMRS and/or TRS, the number of orthogonal sequences of the codebook is determined as ($\text{Num}_{RE}$−$\text{Num}_{RS}$)=M×N−4.

Upon successfully encoding the UCI and mapping the DMRS, the TRS, and/or the RS and the code point of the UCI, the UE 402 may transmit the uplink control signal including the UCI and DMRS, TRS, and/or RS to the base station 404 over the PUCCH 414. The base station 404 may receive the uplink control signal and estimate the channel parameters 420 based on DMRS, TRS, and/or RS received from the UE 402. Particularly, the base station 404 may estimate first-order channel parameters, such as a Doppler spread error, a delay spread error, or a timing error of the uplink control channel based on the DMRS, the TRS, and/or the RS. Particularly, the base station 404 may compensate the uplink control signal based on the estimated first-order channel parameters to reduce the Doppler spread error, the delay spread error, and/or the timing error prior to the decoding of the uplink control signal.

The base station 404 may compensate the uplink control signal received from the UE 402 based on the channel parameters estimated based on the DMRS, the TRS, and/or the RS 422. The base station 404 may compensate the uplink control signal received from the UE 402 based on the Doppler spread error, the delay spread error, or the timing error estimated based on the DMRS, the TRS, and/or the RS. Accordingly, the base station 404 may obtain more accurate uplink control signal.

The base station 404 may decode the uplink control signal into code point 424. Particularly the base station 404 may decode the uplink control signal on the resource elements of the uplink control channel received from the UE 402 into the code point by performing a two dimensional (2D) inverse discrete Fourier transform (IDFT) sequence detection. For example, when the base station 404 instructed the UE 402 to map the DMRS, the TRS, and/or the RS into the punctured resource elements of the uplink control signal in the control information 408, the base station 404 may replace the resource elements of the uplink control signal corresponding to the DMRS, the TRS, and/or the RS pattern with zero values, and decode the uplink control signal received on the resource elements of the uplink control channel from the UE 402 into the code point by performing a two dimensional (2D) inverse discrete Fourier transform (IDFT) (2D-IDFT) sequence detecting based on $\text{Num}_{RE}$ resource elements assigned for the uplink control channel, where the $\text{Num}_{RE}$ is a number of the resource elements assigned for the uplink control channel by the control information received from the base station 404.

When the base station 404 instructed the UE 402 rate match the code point of the UCI around resource elements mapped with the DMRS, the TRS, and/or the RS, the base station 404 may decode the uplink control signal on the resource elements of the uplink control channel received from the UE 402 into the code point by the 2D-IDFT sequence detecting based on ($\text{Num}_{RE}$−$\text{Num}_{RS}$) resource elements not corresponding to the DMRS, the TRS, and/or the RS pattern assigned for the uplink control channel, where the $\text{Num}_{RS}$ is a number of DMRS, the TRS, and/or the RS assigned for the uplink control channel by the control information received from the base station 404. In such a case, the code point of the UCI was rate matched around the resource elements mapped with the DMRS, the TRS, and/or the RS, so the base station 404 does not need to replace the resource elements of the uplink control signal corresponding to the DMRS, the TRS, and/or the RS pattern with zero values.

Based on the outcome of the decoding, the base station 404 may determine the UCI based on the code word corresponding to the code point decoded from the uplink control signal 426. Particularly, the base station 404 may determine that the decoded code point is the $k^{th}$ code point from the codebook. Accordingly, the base station 404 may successfully determine that the UCI payload is the K bits of $b_0 b_1 b_2 \ldots b_{K-1}$.

The base station 404 may transmit the DCI to dynamically enable or disable the RS mode in the UE 402. The base station 404 may also transmit the CG including the RRC message and/or the MAC-CE may semi-statically enable the RS mode for a set duration of time. Particularly, the base station 404 may transmit a DCI 432 instructing the UE 402 to dynamically disable the RS mode 434. The UE 402 may also semi-statically disable the RS mode 434 after a duration of time set based on the CG (e.g., the RRC message or the MAC-CE) 408 received from the base station 404. When the CG semi-statically enables the RS mode, the RS mode is disabled semi-statically after the set duration of time 430. In certain aspects, the base station may configure a certain number of symbols for the DRMS, the TRS, and/or the RS instead of configuring patterns in RRC message and/or the MAC-CE message, and for each OFDM symbol, the base station may determine a certain starting resource element offset (e.g., a frequency domain offset) as well as a gap between two resource elements. In certain aspects, the UE may map the DMRS, the TRS, and/or the RS and the UCI into the resource elements based on the symbols for the DRMS, the TRS, and/or the RS, and/or the starting resource element offset, and/or the gap between the resource elements.

Figure 5:
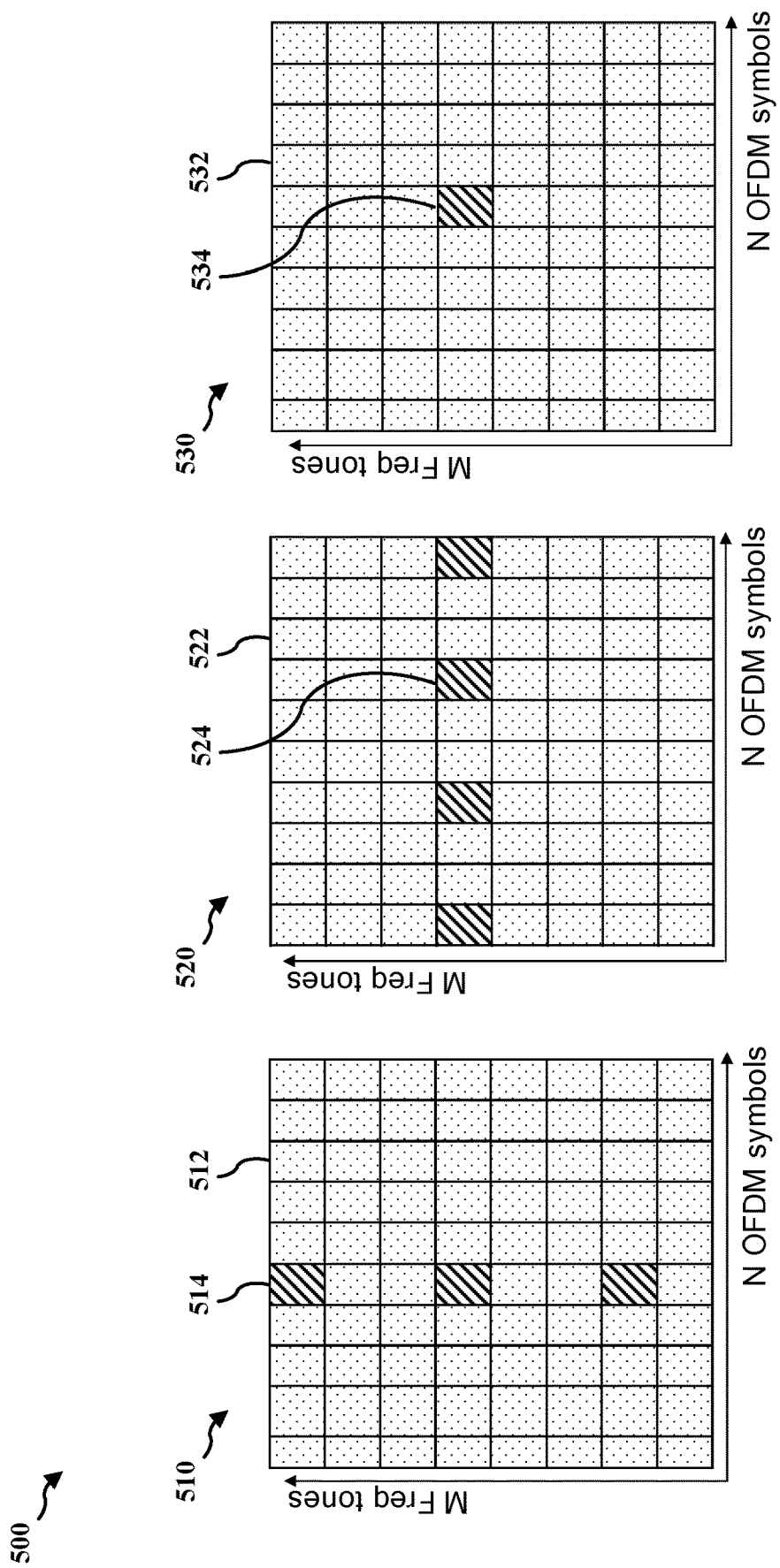
FIGS. 5, 6, and 7 illustrate examples of resource grid of uplink control channel.
Figure 6:
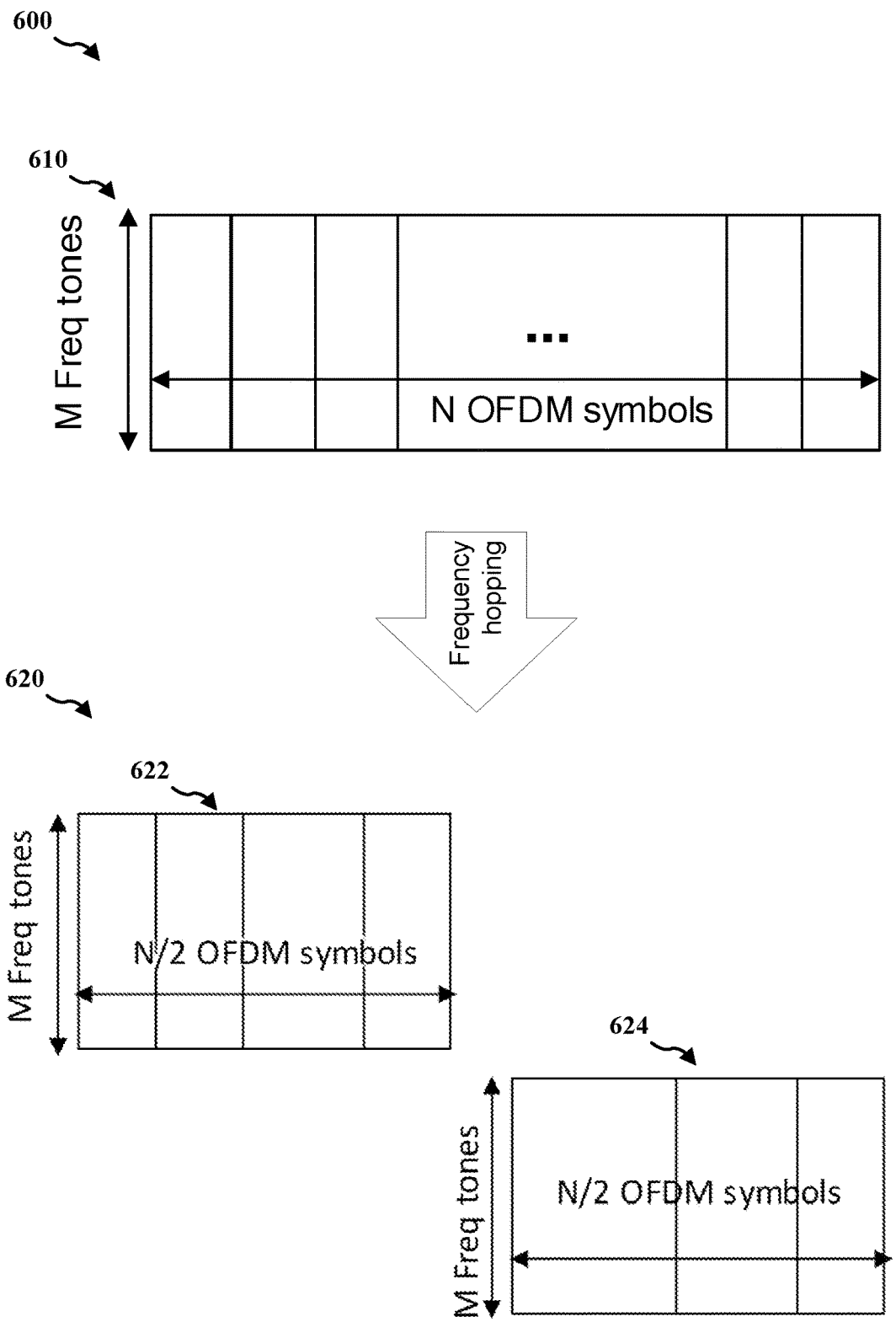
Figure 7:
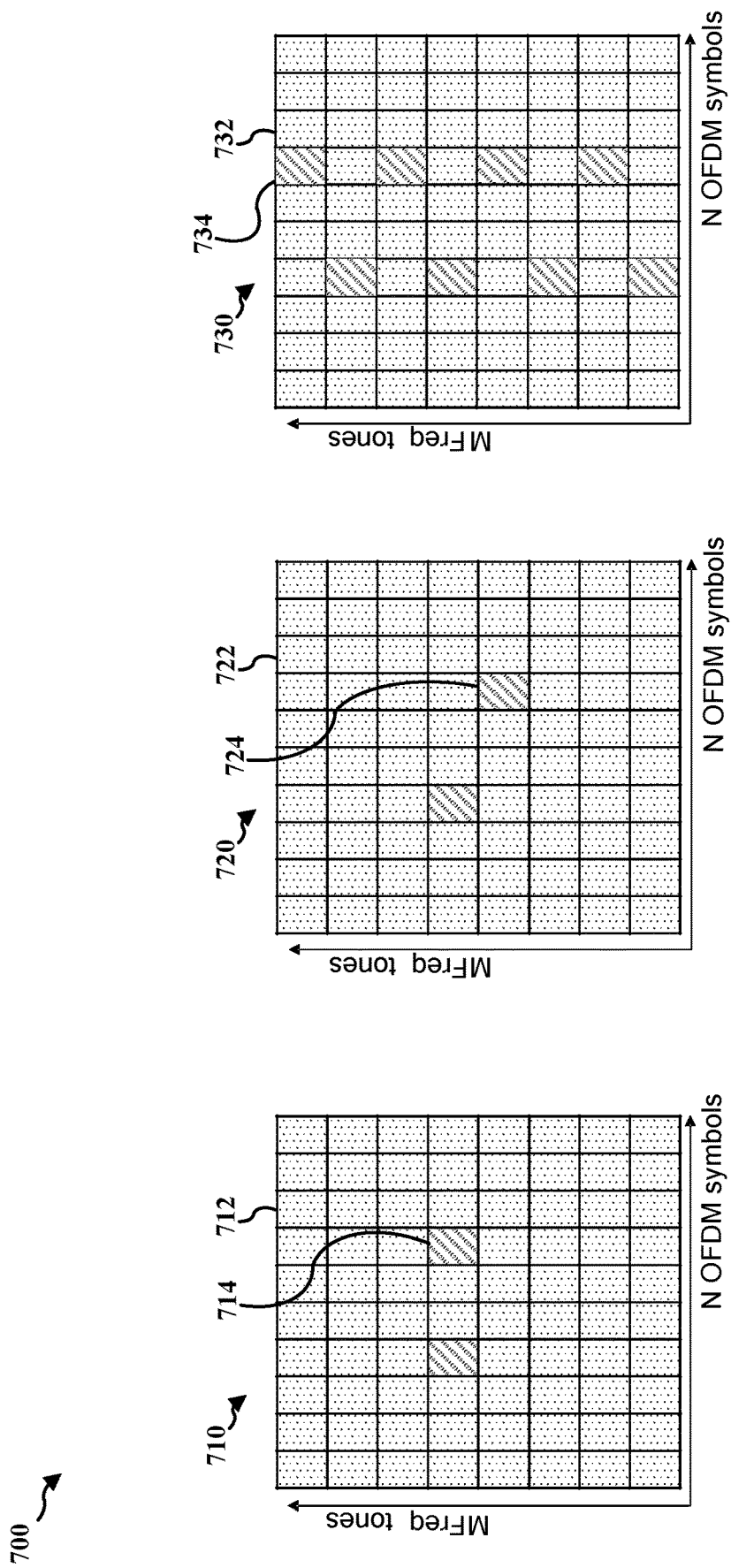

FIGS. 5, 6, and 7 illustrate examples of resource grids 500, 600, and 700 for an uplink control channel. Referring to FIG. 5, illustrated are examples of resource grids 510, 520, and 530, that include resource elements 512, 522, and 532, respectively, mapped with a code point of the UCI, and resource elements 514, 524, and 534, respectively, with a corresponding DMRS, a TRS, and/or an RS. The DMRS illustrated in 510, 520, and 530 are mapped with different DMRS, TRS, and/or RS patterns distributed along at least one of a time domain or a frequency domain.

For example, the resource grid 510 includes the DMRS, the TRS, and/or the RS pattern 514 distributed along the time domain. The resource grid 520 includes the DMRS, the TRS, and/or the RS pattern 524 distributed along the frequency domain. The resource grid 530 includes the DMRS, the TRS, and/or the RS pattern 534 mapping the DMRS to one time/frequency resource.

As proffered, grids 510, 520, and 530 include the code point of the UCI 512, 522, and 532, and the DMRS, the TRS, and/or the RS 514, 524, and 534 mapped to the resource elements.

In some aspects, the UE 402 may map the code point of the UCI into the resource elements of the resource grid 510, 520, and 530 assigned for the PUCCH. The UE 402 may puncture the resource elements mapped with the code point of the UCI 512, 522, and 532 that corresponds to the DMRS, the TRS, and/or the RS pattern. By puncturing, the UE may delete the data of the resource elements mapped with the code point of the UCI. The UE may subsequently map the DMRS, the TRS, and/or the RS 514, 524, and 534 into the resource elements based on the DMRS, the TRS, and/or the RS pattern. Accordingly, the number of orthogonal sequences of the codebook is maintained equal to the number of the resource elements assigned for the PUCCH. Since the DMRS, the TRS, and/or the RS is introduced by puncturing the data mapped to the resource elements, the data of the resource elements corresponding to the DMRS, the TRS, and/or the RS pattern may be lost. However, the number of orthogonal sequences of the codebook may be maintained as $\text{Num}_{RE}$, the number of the resource elements assigned for the PUCCH by the control information received from the base station. The DMRS, the TRS, and/or the RS pattern is sparse such that there are a few DMRS symbols across the grid. This enables the data signal to be replaced at locations of the DMRS, the TRS, and/or the RS pattern with the DMRS/TRS/pilot/reference tones referred as puncturing. The DMRS, the TRS, and/or the RS symbol may be as small as one OFDM symbol or frequency tone.

In some aspects, the UE may map the DMRS 514, 524, and 534 into the resource elements according to the DMRS pattern, and map the code point of the UCI 512, 522, and 532 into the resource elements assigned for the uplink control channel by rate matching around the resource elements mapped with the DMRS, the TRS, and/or the RS. To rate match around the resource elements mapped with the DMRS, the TRS, and/or the RS, the number of orthogonal sequences of the codebook is determined as ($\text{Num}_{RE}-\text{Num}_{RS}$), where the $\text{Num}_{RS}$ is a number of DMRS assigned for the uplink control channel by the control information received from the base station.

Referring to FIG. 6, the resource grids 600 include resource grids 610 and 620 for carrying the PUCCH. The resource grid 610 illustrates the PUCCH with no frequency hopping, and the resource grid 610 illustrates the PUCCH with frequency hopping. Particularly, the first half of the PUCCH 622 and the second half of the PUCCH 624 are arranged in different frequency bands with different channel coefficients. Returning back to the examples illustrated in Table 2, as depicted in FIG. 3C, for description purposes, each half of the PUCCH may have two channel coefficients represented as $h_1$ and $h_2$. When the transmitter sends the code point 0, the receiver receives the signal of $[h_1, h_1, h_2, h_2]$. When correlating the received signal with code point 1, which is supposed to be orthogonal, the output is $h_1*1+h_1*j+h_2*(-1)+h_2*(-j)\neq 0$. Therefore, the code point 0 and the code point 1 are orthogonal from the receiver's perspective, and the receiver may use the same codebook to decode the received signal to determine the code word corresponding to the code point. However, with the DMRS, the TRS, and/or the RS included in the PUCCH, the receiver may use the channel estimation to maintain orthogonality of the code points. In one example, the output may be divided by the corresponding channel coefficient. The output may be $$\frac{h_1*1+h_1*j}{h_1}+\frac{h_2*(-1)+h_2*(-j)}{h_2}=1+j+(-1)+(-j)=0.$$

Therefore, the orthogonality of the code points is maintained from the receiver's perspective.

Referring to FIG. 7, the resource grids 700 include resource grids 710, 720, and 730, including resource elements 712, 722, and 732 mapped with the code point of the UCI, and resource elements 714, 724, and 734 mapped with the DMRS, the TRS, and/or the RS having different DMRS, the TRS, and/or the RS patterns, the DMRS, the TRS, and/or the RS patterns distributed along at least one of a time domain or a frequency domain. The UE may determine DMRS, the TRS, and/or the RS patterns according to the modulation scheme indicated in the control information received from the base station 404. Particularly, the resource grid 710 includes two resource elements 714 mapped with the DMRS, the TRS, and/or the RS arranged on the same frequency tone, the resource grid 720 includes two resource elements 724 mapped with the DMRS, the TRS, and/or the RS arranged on different frequency tones, and the resource grid 730 includes multiple resource elements 714 mapped with the DMRS, the TRS, and/or the RS arranged on different frequency tones. Note that in the three examples, the DMRS, the TRS, and/or the RS is arranged on the same two OFDM symbols.

In some aspects, the UE 402 may select the DMRS, the TRS, and/or the RS pattern of the resource grid 720 for mapping the DMRS, the TRS, and/or the RS 714 by puncturing the resource elements mapped with the code point of the UCI 712 that corresponds to the DMRS, the TRS, and/or the RS pattern. Since the data of the punctured resource elements is lost and no longer transmitted, the UE 402 may reduce the number of lost data per frequency tone by disposing the DMRS, the TRS, and/or the RS pattern on different frequency tones.

In some aspects, for frequency hopping, the UE 402 may arrange at least one DMRS, TRS, and/or RS per sub-band. The base station 404 may use the DMRSs, the TRSs, and/or the RSs to maintain the code point orthogonality.

Figure 8:
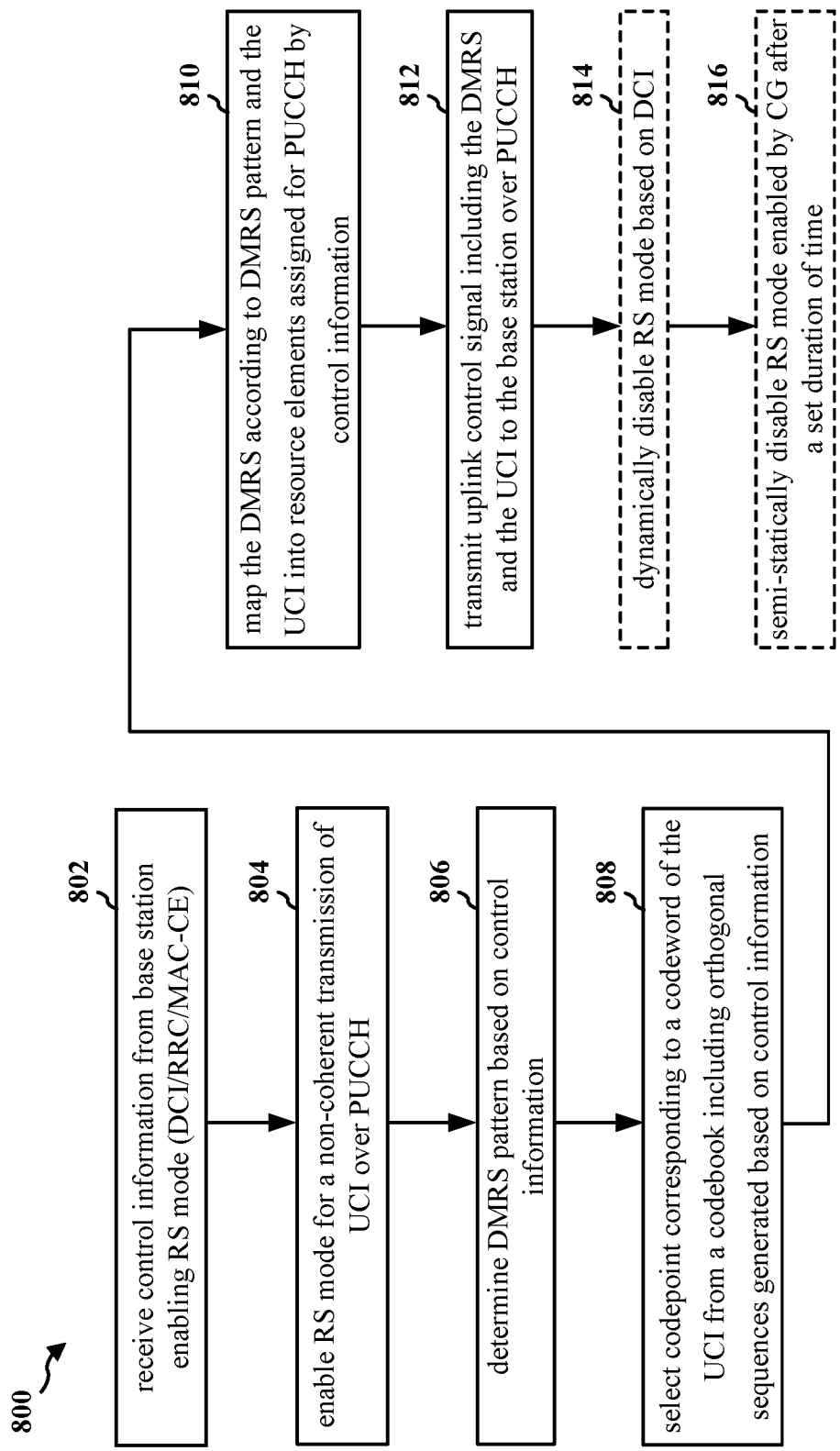
FIG. 8 is a flowchart of a method of wireless communication of a UE.

FIG. 8 is a flowchart 800 of a method of wireless communication. The method may be performed by a UE (e.g., the UE 104; the apparatus 1002). At 802, the UE may receive the control information, including the DCI, the RRC message, and/or the MAC-CE (408) from the base station instructing the UE to enable the RS mode. For example, 802 may be performed by a reception component 1030.

At 804, the UE may enable the RS mode (410) for the non-coherent transmission of UCI over PUCCH. In certain aspects, the UE detects whether the control information from the base station indicates enabling RS mode for non-coherent transmission of UCI over PUCCH, and the UE enables the RS mode based on the detection that the control information indicates enablement of the RS mode. In certain aspects, for example, the UE may enable RS mode in response to receiving the control information from the base station. For example, 804 may be performed by an RS mode management component 1040.

At 806, the UE may determine the DMRS, the TRS, and/or the RS pattern (411) based on control information. In certain aspects, the UE may detect a pattern in received control information from the base station, and the UE may apply the pattern to transmission of the DMRS, the TRS, and/or the RS. For example, 806 may be performed by a DMRS component 1042.

At 808, the UE may select the code point corresponding to a code word of the UCI from the codebook including the orthogonal sequences generated based on the control information received from the base station. In certain aspects, the UE may determine the number of orthogonal sequences based on the number of resource elements assigned for the PUCCH by the control information received from the base station. In certain aspects, the UE may identify the code point based on the number of orthogonal sequences. For example, 808 may be performed by a UCI coding component 1044.

At 810, the UE may map the DMRS, the TRS, and/or the RS and the UCI into resource elements (412) assigned for the PUCCH by control information. The DMRS may be mapped according to a DMRS, a TRS, and/or a RS pattern. In certain aspects, the UE may map the DMRS, the TRS, and/or the RS by mapping the code point of the UCI into the resource elements. In certain aspects, the UE may puncture the resource elements mapped with the code point of the UCI that corresponds to the DMRS, the TRS, and/or the RS pattern and map the DMRS, the TRS, and/or the RS into the punctured resource elements based on the DMRS, the TRS, and/or the RS pattern. In certain aspects, the UE may map the DMRS, the TRS, and/or the RS into the resource elements based on the DMRS, the TRS, and/or the RS pattern. In certain aspects, the UE may map the code point of the UCI into the resource elements assigned for the uplink control channel by rate matching around the resource elements mapped with the DMRS, the TRS, and/or the RS. In certain aspects, the UE may map the DMRS, the TRS, and/or the RS and the UCI based on enabling the non-coherent transmission mode (e.g., RS mode). For example, 810 may be performed by a uplink channel mapping component 1046.

At 812, the UE may transmit the uplink control signal (414) including the DMRS, the TRS, and/or the RS and the UCI to the base station over the PUCCH. For example, 812 may be performed by the RS mode management component 1040.

At 814, the UE may dynamically disable the RS mode based on the DCI. In certain aspects, the UE may detect information indicating disablement of the RS mode in a DCI received from the base station. In certain aspects, the UE disables the RS mode based on the detection of the information indicating the disablement of RS mode. For example, 814 may be performed by the RS mode management component 1040.

Finally, at 816, the UE may semi-statically disable the RS mode enabled by the CG after a set duration of time. In certain aspects, the UE may be configured to disable the RS mode based on the duration of time. For example, 816 may be performed by a transmission component 1034.

In certain aspects, the UE may determine the DMRS, the TRS, and/or the RS pattern based on the control information received from the base station.

In certain aspects, the UE may map the DMRS, the TRS, and/or the RS and the UCI into resource elements by mapping the code point corresponding to the code word of the UCI into the resource elements assigned for the uplink control channel, puncturing the resource elements mapped with the code point of the UCI that corresponds to the DMRS, the TRS, and/or the RS pattern, and mapping the DMRS, the TRS, and/or the RS into the punctured resource elements based on the DMRS, the TRS, and/or the RS pattern.

In certain aspects, a number of orthogonal sequences of the codebook is equal to a number of the resource elements $Num_{RE}$ assigned for the uplink control channel by the control information.

In certain aspects, the UE may map the DMRS, the TRS, and/or the RS and the UCI into the resource elements by mapping the RS into the resource elements according to the DMRS, the TRS, and/or the RS pattern. In certain aspects, the UE may map the code point of the UCI into the resource elements assigned for the uplink control channel by rate matching around the resource elements into which the DMRS, the TRS, and/or the RS is mapped according to the DMRS, the TRS, and/or the RS pattern.

In certain aspects, a number of orthogonal sequences of the codebook is determined as ($Num_{RE}$–$Num_{RS}$), where Num$_{RE}$ is a number of the resource elements assigned for the uplink control channel by the control information received from the base station, and Num$_{RS}$ is a number of DMRS, TRS, and/or RSs assigned for the uplink control channel by the control information received from the base station.

In certain aspects, the DMRS, the TRS, and/or the RS pattern is distributed along at least one of a time domain or a frequency domain.

In certain aspects, a distribution of the uplink control channel may be switched between at least two sub-bands in different frequency bandwidths with different channel coefficients based on the control information received from the base station and the DMRS, the TRS, and/or the RS pattern may be distributed along a time domain, with at least one DMRS, TRS, and/or RS element included in each of the at least two sub-bands.

In certain aspects, the UE may enable the RS mode for the non-coherent transmission of the UCI to the base station based on the control information received from the base station, the control information being at least one of a downlink control information (DCI) or a configured grant (CG) including at least one of a radio resource control (RRC) message or a medium access control (MAC) control element (CE) (MAC-CE).

In certain aspects, the UE may dynamically disable the RS mode based on the DCI received from the base station.

In certain aspects, the UE may enable the RS mode based on at least one of the RRC message or the MAC-CE is disabled after a duration of time set based on the CG received from the base station.

Figure 9:
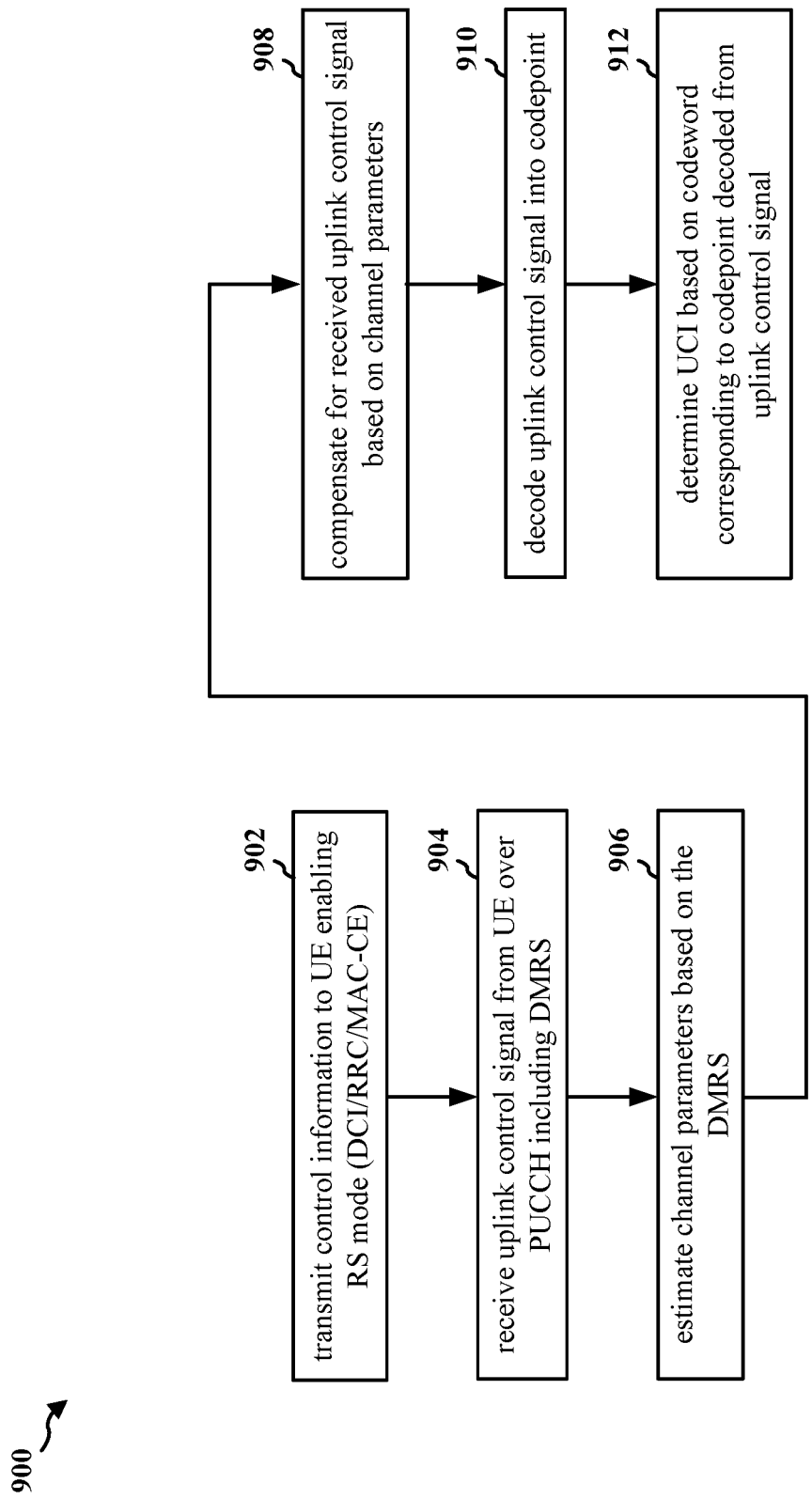
FIG. 9 is a flowchart of a method of wireless communication of a base station.

FIG. 9 is a flowchart 900 of a method of wireless communication. The method may be performed by a base station (e.g., the base station 102/180; the apparatus 1102. At 902, the base station may transmit the control information, including the DCI, the RRC, and the MAC-CE (408) to the UE instructing the UE to enable the RS mode. For example, 902 may be performed by a transmission component 1134.

At 904, the base station may receive the uplink control signal 414 from UE over the PUCCH including the DMRS, the TRS, and/or the RS. For example, 904 may be performed by a reception component 1130.

At 906, the base station may estimate the channel parameters based on the DMRS, the TRS, and/or the RS. For example, 906 may be performed by a channel parameter component 1140.

At 908, the base station may compensate the received uplink control signal based on the channel parameters. In certain aspects, at least one of the channel parameters is least one of a Doppler spread error, a delay spread error, or a timing error of the uplink control channel. In certain aspects, the base station may be configured to detect one or more of the channel parameters and apply an algorithm and/or a function intended to reduce the effects of the one or more channel parameters (e.g., Doppler spread error, a delay spread error, or a timing error of the uplink control channel). For example, 908 may be performed by a uplink control signal management component 1142.

At 910, the base station may decode the uplink control signal into the code point. In certain aspects, the base station may decode the uplink control signal into the code point by replacing resource elements of the uplink control signal carrying the DMRS, the TRS, and/or the RS corresponding to the DMRS, the TRS, and/or the RS pattern to 0, based on instructing the UE to map the DMRS, the TRS, and/or the RS into the punctured resource elements of the uplink control signal, and decoding the uplink control signal on the resource elements of the uplink control channel received from the UE into the code point by applying a two dimensional (2D) inverse discrete Fourier transform (IDFT) sequence detection based on Num$_{RE}$ resource elements assigned for the uplink control channel, where Num$_{RE}$ is a number of the resource elements assigned for the uplink control channel by the control information sent by the base station. For example, 910 may be performed by the uplink control signal management component 1142.

Finally, at 912, the base station may determine the UCI based on the code word corresponding to the code point decoded from the uplink control signal. In certain aspects, the base station may decode the uplink control signal on the resource elements of the uplink control channel received from the UE into a code point by performing a 2D IDFT sequence detection. In certain aspects, the base station may identify a code word corresponding to the decoded code point and determine UCI based on the code word. For example, 912 may be performed by a UCI deciding component 1144.

In certain aspects, the base station may decode the uplink control signal by replacing resource elements of the uplink control signal carrying the DMRS, the TRS, and/or the RS corresponding to the DMRS, the TRS, and/or the RS pattern to 0, based on instructing the UE to map the DMRS, the TRS, and/or the RS into the punctured resource elements of the uplink control signal, and decoding the uplink control signal on the resource elements of the uplink control channel received from the UE into the code point by applying a two dimensional (2D) inverse discrete Fourier transform (IDFT) sequence detection based on Num$_{RE}$ resource elements assigned for the uplink control channel, where Num$_{RE}$ is a number of the resource elements assigned for the uplink control channel by the control information sent by the base station.

In certain aspects, when the base station instructs the UE to rate match, the base station may decode the uplink control signal by decoding the uplink control signal on the resource elements of the uplink control channel received from the UE into the code point by applying a two dimensional (2D) inverse discrete Fourier transform (IDFT) sequence detection based on (Num$_{RE}$–Num$_{RS}$) resource elements not corresponding to the DMRS, the TRS, and/or the RS pattern assigned for the uplink control channel, where Num$_{RE}$ is a number of the resource elements assigned for the uplink control channel by the control information received from the base station, and the Num$_{RS}$ is a number of RSs assigned for the uplink control channel by the control information received from the base station.

In certain aspects, when the control information instructs the UE to switch the DMRS, the TRS, and/or the RS distribution of the uplink control channel between at least two sub-bands in different frequency bandwidths with different channel coefficients, the base station may decode the uplink control signal by dividing the uplink control signal on the resource elements of the uplink control channel distributed over the at least two sub-bands by a corresponding channel coefficient.

In certain aspects, the control information transmitted to the UE is a DCI dynamically enabling or disabling the RS mode of the UE.

In certain aspects, the control information transmitted to the UE is at least one of a radio resource control (RRC) or a medium access control (MAC) control element (CE) (MAC-CE) semi-statically enabling the RS mode of the UE for a duration of time.

Figure 10:
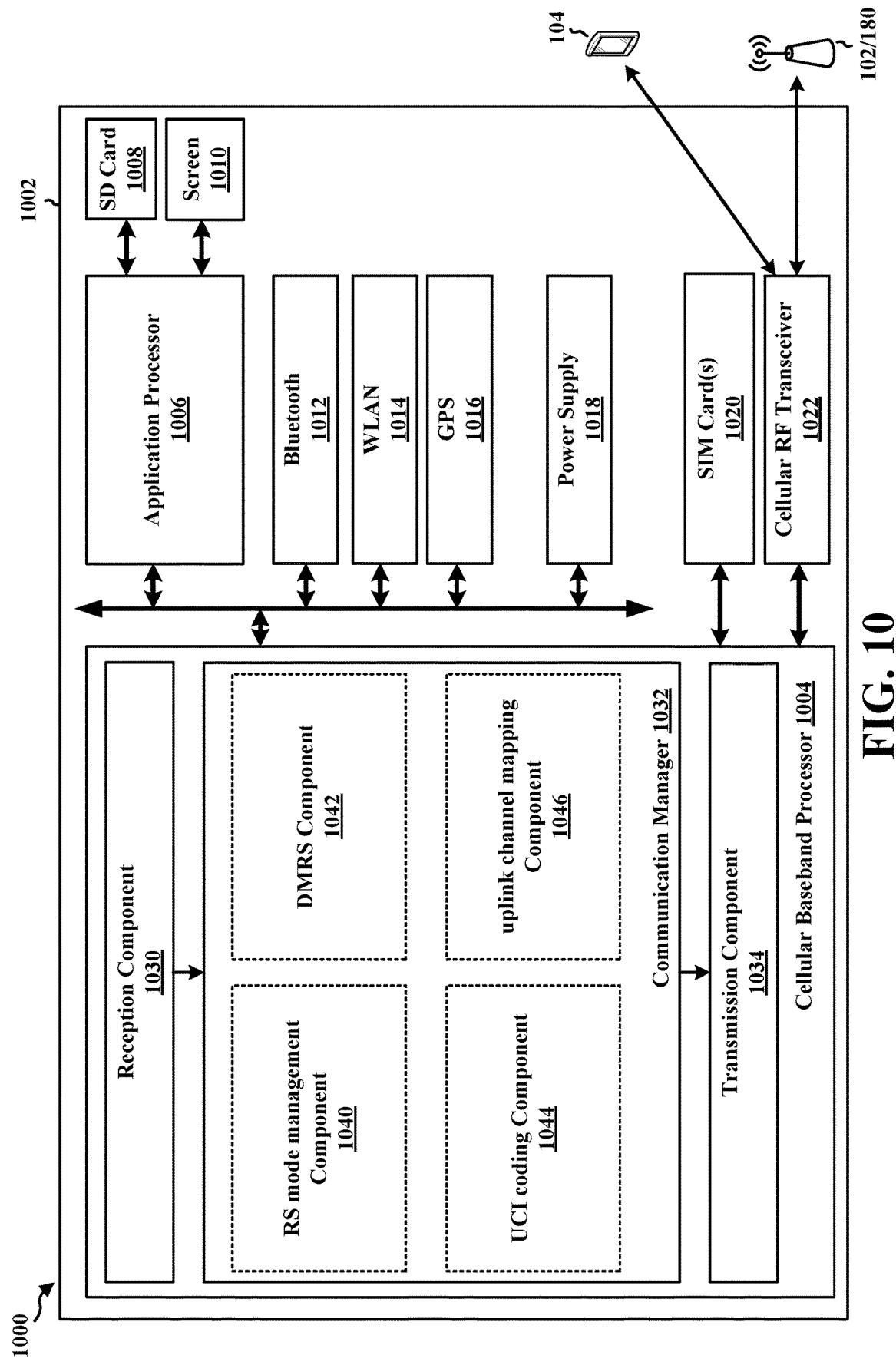
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3A) and include the aforementioned additional modules of the apparatus 1002.

The communication manager 1032 includes an RS mode management component 1040 that is configured to enable the RS mode for the non-coherent transmission of UCI over PUCCH, dynamically disable the RS mode based on the DCI, and semi-statically disable the RS mode enabled by the CG after a set duration of time, e.g., as described in connection with 804, 812, and 814 of FIG. 8. The communication manager 1032 further includes a DMRS/TRS/RS component 1042 that is configured to determine the DMRS, the TRS, and/or the RS pattern based on control information, e.g., as described in connection with 806 of FIG. 8. The communication manager 1032 includes a UCI coding component 1044 that is configured to select the code point corresponding to a code word of the UCI from the codebook including the orthogonal sequences generated based on the control information received from the base station, e.g., as described in connection with 808 of FIG. 8. The communication manager 1032 further includes a uplink channel mapping component 1046 that is configured to map the DMRS, the TRS, and/or the RS according to DMRS, the TRS, and/or the RS pattern and the UCI into resource elements assigned for PUCCH by control information, e.g., as described in connection with 810 of FIG. 8.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving the control information from a base station, means for mapping the DMRS, the TRS, and/or the RS according to a DMRS, a TRS, and/or a RS pattern and the UCI into the resource elements assigned for the PUCCH, means for transmitting an uplink control signal including the DMRS, the TRS, and/or the RS and the UCI to the base station over the PUCCH, means for determining the DMRS, the TRS, and/or the RS pattern based on the control information, means for selecting a code point corresponding to a code word of the UCI from a codebook including orthogonal sequences generated based on the control information received from the base station, and means for enabling the DMRS, the TRS, and/or the RS mode for the non-coherent transmission of the UCI to the base station based on a control information received from the base station, the control information received from the base station being at least one of the DCI or the CG including the RRC and/or the MAC-CE. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

In an additional configuration, the apparatus 1002 further includes means for determining the RS pattern based on the control information received from the base station.

In an additional configuration, the apparatus 1002 further includes means for selecting a code point corresponding to a code word of the UCI from a codebook including orthogonal sequences generated based on the control information received from the base station.

In an additional configuration, the means for mapping the DMRS, the TRS, and/or the RS and the UCI into the resource elements by the UE in the DMRS, the TRS, and/or the RS mode is configured to map the code point corresponding to the code word of the UCI into the resource elements assigned for the uplink control channel, puncture the resource elements mapped with the code point of the UCI that corresponds to the DMRS, the TRS, and/or the RS pattern, and map the DMRS, the TRS, and/or the RS into the punctured resource elements based on the DMRS, the TRS, and/or the RS pattern.

In an additional configuration, the means for mapping the DMRS, the TRS, and/or the RS and the UCI into the resource elements by the UE in the DMRS, the TRS, and/or the RS mode is configured to map the DMRS, the TRS, and/or the RS into the resource elements according to the DMRS, the TRS, and/or the RS pattern, and map the code point of the UCI into the resource elements assigned for the uplink control channel by rate matching around the resource elements into which the DMRS, the TRS, and/or the RS is mapped according to the DMRS, the TRS, and/or the RS pattern.

In an additional configuration, the apparatus 1002 further includes means for enabling the RS mode for the non-coherent transmission of the UCI to the base station based on the control information received from the base station, the control information being at least one of a downlink control information (DCI) or a configured grant (CG) including at least one of a radio resource control (RRC) message or a medium access control (MAC) control element (CE) (MAC-CE).

Figure 11:
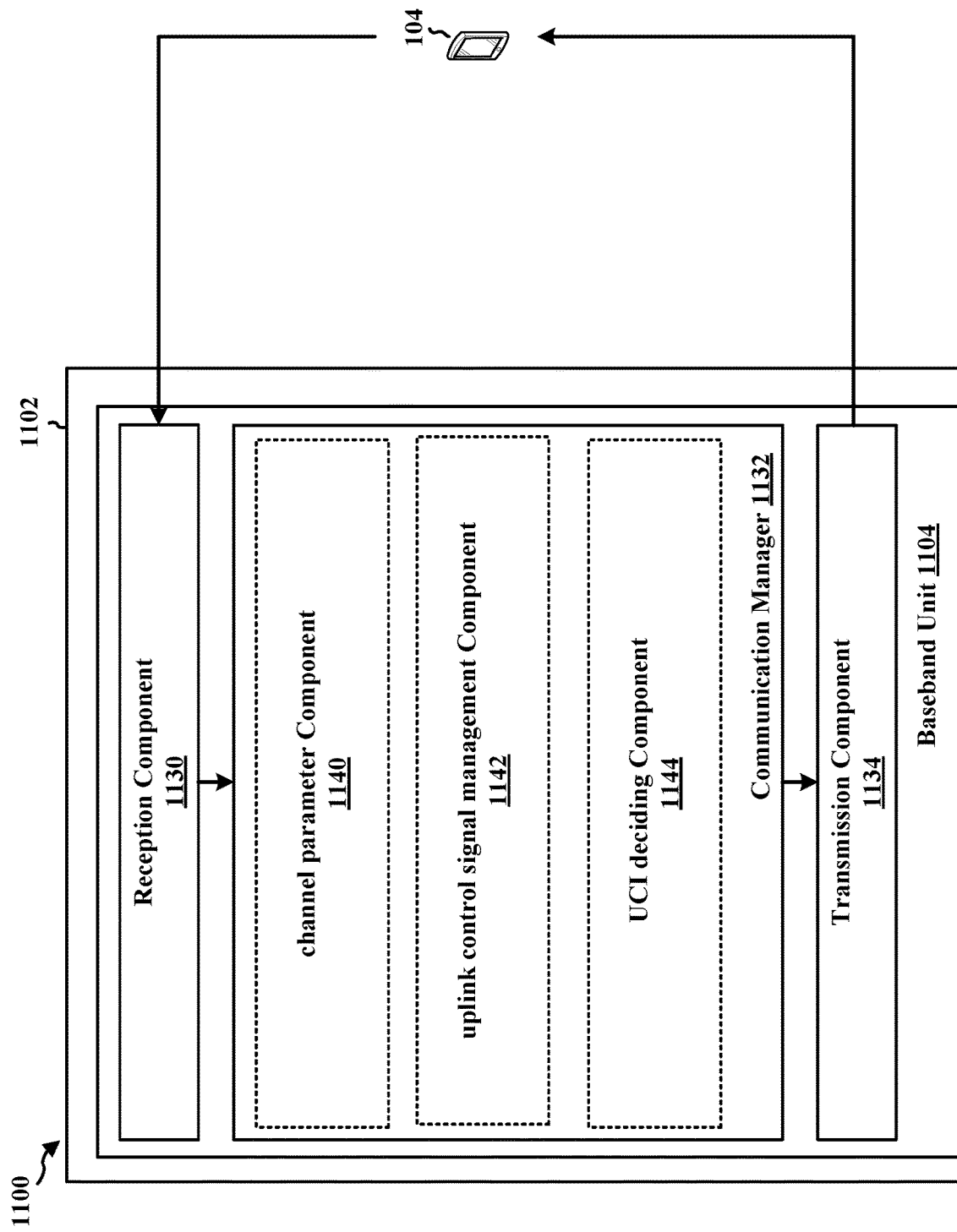
FIG. 11 is a diagram illustrating an example of a hardware implementation for an example apparatus.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes a channel parameter component 1140 that is configured to estimate the channel parameters based on the DMRS, the TRS, and/or the RS, e.g., as described in connection with 906 of FIG. 9. The communication manager 1132 further includes a uplink control signal management component 1142 that is configured to compensate the received uplink control signal based on the channel parameters and decode the uplink control signal into the code point, e.g., as described in connection with 908 and 910 of FIG. 9. The communication manager 1132 further includes a UCI deciding component 1144 that is configured to decode the uplink control signal into the code point, e.g., as described in connection with 912 of FIG. 9.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for means for transmitting a control information to the UE indicating the RS mode for the UE to transmit the DMRS, the TRS, and/or the RS for the non-coherent transmission of the UCI to the base station, means for estimating the channel parameters based on the DMRS, the TRS, and/or the RS in the uplink control signal received from the UE over the PUCCH, the DMRS, the TRS, and/or the RS distributed in the uplink control channel according to the DMRS, the TRS, and/or the RS pattern determined based on the control information, means for compensating the uplink control signal received from the UE based on the channel parameters estimated based on the DMRS, the TRS, and/or the RS, means for decoding the uplink control signal received from the UE into the code point, and means for determining the UCI based on the code word corresponding to the code point decoded from the uplink control signal. The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

In an additional configuration, the means for decoding the uplink control signal is configured to replace resource elements of the uplink control signal carrying the DMRS, the TRS, and/or the RS corresponding to the DMRS, the TRS, and/or the RS pattern to 0, based on instructing the UE to map the DMRS, the TRS, and/or the RS into the punctured resource elements of the uplink control signal, and decode the uplink control signal on the resource elements of the uplink control channel received from the UE into the code point by applying a two dimensional (2D) inverse discrete Fourier transform (IDFT) sequence detection based on $Num_{RE}$ resource elements assigned for the uplink control channel, where $Num_{RE}$ is a number of the resource elements assigned for the uplink control channel by the control information sent by the base station.

In an additional configuration, when the UE is instructed to rate match, the means for decoding the uplink control signal is configured to decode the uplink control signal on the resource elements of the uplink control channel received from the UE into the code point by applying a two dimensional (2D) inverse discrete Fourier transform (IDFT) sequence detection based on ($Num_{RE}$–$Num_{RS}$) resource elements not corresponding to the DMRS, the TRS, and/or the RS pattern assigned for the uplink control channel, where $Num_{RE}$ is a number of the resource elements assigned for the uplink control channel by the control information received from the base station, and the $Num_{RS}$ is a number of DMRSs, TRSs, and/or RSs assigned for the uplink control channel by the control information received from the base station.

In an additional configuration, where, based on the control information instructing the UE to switch the DMRS, the TRS, and/or the RS distribution of the uplink control channel between at least two sub-bands in different frequency bandwidths with different channel coefficients, the means for decoding the uplink control signal is configured to divide the uplink control signal on resource elements of the uplink control channel distributed over the at least two sub-bands by a corresponding channel coefficient.

Referring again to FIGS. 4, 5, 6, 7, 8, 9, 10, and 11, the UE may receive the control information from the base station to enable the RS mode for a non-coherent transmission of the UCI to the base station. The UE in the RS mode may map the DMRS, the TRS, and/or the RS according to the DMRS, the TRS, and/or the RS pattern and the UCI into the resource elements assigned for the PUCCH by the control information to transmit the UCI, and transmit the uplink control signal including the DMRS, the TRS, and/or the RS and the UCI to the base station over the PUCCH. The UE may determine the DMRS, the TRS, and/or the RS pattern based on the control information received from the base station. The UE may select the code point corresponding to the code word of the UCI from the codebook including orthogonal sequences generated based on the control information received from the base station. The UE may map the DMRS, the TRS, and/or the RS and the UCI into the resource elements by mapping the code point of the UCI into the resource elements assigned for the uplink control channel, In one example, the UE may puncture the resource elements mapped with the code point of the UCI that corresponds to the DMRS, the TRS, and/or the RS pattern and map the DMRS, the TRS, and/or the RS into the punctured resource elements based on the DMRS, the TRS, and/or the RS pattern. The number of orthogonal sequences of the codebook may be equal to the number of the resource elements $Num_{RE}$ assigned for the PUCCH by the control information received from the base station. In another example, the UE may map the DMRS, the TRS, and/or the RS into the resource elements according to the DMRS, the TRS, and/or the RS pattern and map the code point of the UCI into the resource elements assigned for the PUCCH by rate matching around the resource elements mapped with the RS. The number of orthogonal sequences of the codebook is determined as ($Num_{RE}$–$Num_{RS}$), where the $Num_{RS}$ is the number of DMRS, TRS, and/or RS assigned for the PUCCH by the control information received from the base station. The DMRS, the TRS, and/or the RS pattern may be distributed along the time domain and/or the frequency domain. When the PUCCH performs frequency hopping, the PUCCH may be switched between at least two sub-bands in different frequency bandwidths with different channel coefficients based on the control information received from the base station, the DMRS, the TRS, and/or the RS pattern may be distributed along a time domain, with at least one DMRS, TRS, and/or RS included in each of the at least two sub-bands. The control information may be the DCI or the CG including the RRC message and/or the MAC-CE, enabling or disabling the RS mode. The UE may enable the RS mode for the non-coherent transmission of the UCI to the base station based on the control information. The UE may dynamically enable/disable the RS mode based on the DCI received from the base station, and semi-statically disable the RS mode after a duration of time set based on the CG.

The base station may transmit the control information to the UE indicating the RS mode for the UE to transmit the DMRS, the TRS, and/or the RS for the non-coherent transmission of the UCI to the base station. The base station may receive the uplink control signal from the UE over the PUCCH, and estimate the channel parameters based on the DMRS, the TRS, and/or the RS in the uplink control signal. The DMRS, the TRS, and/or the RS may be distributed in the PUCCH according to the DMRS, the TRS, and/or the RS pattern determined based on the control information the base station transmitted to the UE. The base station may compensate the uplink control signal based on the channel parameters estimated based on the DMRS, the TRS, and/or the RS. The base station then may decode the uplink control signal received from the UE into the code point, and determine the UCI based on the code word corresponding to the code point decoded from the uplink control signal. The channel parameters may include the first-order channel parameters such as a Doppler spread error, a delay spread error, and/or a timing error of the uplink control channel, and the uplink control signal may be compensated based on the channel parameters of the PUCCH. The base station may decode the uplink control signal by replacing the resource elements of the uplink control signal corresponding to the DMRS, the TRS, and/or the RS pattern with 0, based on instructing the UE to map the DMRS, the TRS, and/or the RS into the punctured resource elements of the uplink control signal, and decoding the uplink control signal on the resource elements of the PUCCH received from the UE into the code point by two dimensional (2D) inverse discrete Fourier transform (IDFT) sequence detecting based on the $Num_{RE}$ resource elements assigned for the uplink control channel. Also, the base station may decode of the uplink control signal by decoding the uplink control signal on the resource elements of the PUCCH received from the UE into the code point by two dimensional (2D) inverse discrete Fourier transform (IDFT) sequence detecting based on the ($Num_{RE}$–$Num_{RS}$) resource elements not corresponding to the DMRS, the TRS, and/or the RS pattern assigned for the uplink control channel, based on instructing the UE to rate match the code point of the UCI around the resource elements mapped with the DMRS, the TRS, and/or the RS. In case the base station instructed the UE to perform frequency hopping by switching a distribution of the PUCCH between at least two sub-bands in different frequency bandwidths with different channel coefficients, the base station may decode the uplink control signal by dividing each of the uplink control signal on the resource elements of the PUCCH distributed in at least two sub-bands by the corresponding channel coefficient. The base station may transmit the DCI to dynamically enabling or disabling the RS mode of the UE, and may transmit the RRC message and/or the MAC-CE to semi-statically enable the RS mode of the UE for a duration of time.

By instructing the UE to enable the RS mode and include the DMRS, the TRS, and/or the RS in the uplink control signal for the UCI transmission within the PUCCH, the base station may estimate the first-order channel parameters such as the Doppler spread, the delay spread, or the timing errors based on the DMRS, the TRS, and/or the RS and compensate the received uplink control signal to obtain more accurate uplink control signal. Also, the base station may use the DMRS, the TRS, and/or the RS patterns to estimate the channel coefficients for frequency hopping and maintain the orthogonality of the code points from the receiver's perspective without maintaining separate codebooks.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

What is claimed is:

1. A method of wireless communication by a user equipment (UE), comprising:
   receiving control information from a base station, the control information indicating a reference signal (RS) mode for a non-coherent transmission of an uplink control information (UCI) to the base station;
   mapping, by the UE in the RS mode, an RS and the UCI into resource elements assigned for an uplink control channel by the control information, wherein the RS is mapped according to an RS pattern; and
   transmitting an uplink control signal including the RS and the UCI to the base station over the uplink control channel.

2. The method of claim 1, further comprising:
   determining the RS pattern based on the control information received from the base station.

3. The method of claim 1, further comprising:
   selecting a code point corresponding to a code word of the UCI from a codebook including orthogonal sequences generated based on the control information received from the base station.

4. The method of claim 3, wherein the mapping the RS and the UCI into the resource elements by the UE in the RS mode, comprises:
   mapping the code point corresponding to the code word of the UCI into the resource elements assigned for the uplink control channel;
   puncturing the resource elements mapped with the code point of the UCI that corresponds to the RS pattern; and
   mapping the RS into the punctured resource elements based on the RS pattern.

5. The method of claim 4, wherein a number of orthogonal sequences of the codebook is equal to a number of the resource elements $\text{Num}_{RE}$ assigned for the uplink control channel by the control information.

6. The method of claim 3, wherein the mapping the RS and the UCI into the resource elements by the UE in the RS mode, comprises
   mapping the RS into the resource elements according to the RS pattern; and
   mapping the code point of the UCI into the resource elements assigned for the uplink control channel by rate matching around the resource elements into which the RS is mapped according to the RS pattern.

7. The method of claim 6, wherein a number of orthogonal sequences of the codebook is determined as ($\text{Num}_{RE}$−$\text{Num}_{RS}$), where $\text{Num}_{RE}$ is a number of the resource elements assigned for the uplink control channel by the control information received from the base station, and $\text{Num}_{RS}$ is a number of RSs assigned for the uplink control channel by the control information received from the base station.

8. The method of claim 1, wherein the RS pattern is distributed along at least one of a time domain or a frequency domain.

9. The method of claim 1, wherein a distribution of the uplink control channel is switched between at least two sub-bands in different frequency bandwidths with different channel coefficients based on the control information received from the base station; and
   wherein the RS pattern is distributed along a time domain, with at least one RS element included in each of the at least two sub-bands.

10. The method of claim 1, further comprising:
    enabling the RS mode for the non-coherent transmission of the UCI to the base station based on the control information received from the base station, the control information being at least one of a downlink control information (DCI) or a configured grant (CG) including at least one of a radio resource control (RRC) message or a medium access control (MAC) control element (CE) (MAC-CE).

11. An apparatus for wireless communication, comprising:
    a memory; and
    at least one processor coupled to the memory and configured to:
    receive a control information from a base station, the control information indicating a reference signal (RS) mode for a non-coherent transmission of an uplink control information (UCI) to the base station;
    map, while in the RS mode, an RS and the UCI into resource elements assigned for an uplink control channel by the control information, wherein the RS is mapped according to an RS pattern; and
    transmit an uplink control signal including the RS and the UCI to the base station over the uplink control channel.

12. The apparatus of claim 11, wherein the at least one processor is further configured to:
    determine the RS pattern based on the control information received from the base station.

13. The apparatus of claim 11, wherein the at least one processor is further configured to:
    select a code point corresponding to a code word of the UCI from a codebook including orthogonal sequences generated based on the control information received from the base station.

14. The apparatus of claim 13, wherein the at least one processor is further configured to:
    map the code point corresponding to the code word of the UCI into the resource elements assigned for the uplink control channel;

puncture the resource elements mapped with the code point of the UCI that corresponds to the RS pattern; and
map the RS into the punctured resource elements based on the RS pattern.

15. The apparatus of claim 14, wherein a number of orthogonal sequences of the codebook is equal to a number of the resource elements $Num_{RE}$ assigned for the uplink control channel by the control information.

16. The apparatus of claim 13, wherein the at least one processor is further configured to:
map the RS into the resource elements according to the RS pattern; and
map the code point of the UCI into the resource elements assigned for the uplink control channel by rate matching around the resource elements into which the RS is mapped according to the RS pattern.

17. The apparatus of claim 16, wherein a number of orthogonal sequences of the codebook is determined as $(Num_{RE}-Num_{RS})$, where $Num_{RE}$ is a number of the resource elements assigned for the uplink control channel by the control information received from the base station, and $Num_{RS}$ is a number of RSs assigned for the uplink control channel by the control information received from the base station.

18. The apparatus of claim 11, wherein the RS pattern is distributed along at least one of a time domain or a frequency domain.

19. The apparatus of claim 11, wherein a distribution of the uplink control channel is switched between at least two sub-bands in different frequency bandwidths with different channel coefficients based on the control information received from the base station; and
wherein the RS pattern is distributed along a time domain, with at least one RS element included in each of the at least two sub-bands.

20. The apparatus of claim 11, wherein the at least one processor is further configured to:
enable the RS mode for the non-coherent transmission of the UCI to the base station based on the control information received from the base station, the control information being at least one of a downlink control information (DCI) or a configured grant (CG) including at least one of a radio resource control (RRC) message or a medium access control (MAC) control element (CE) (MAC-CE).

* * * * *